United States Patent [19]

Hehl

[11] 4,382,764

[45] May 10, 1983

[54] CONTACT LEDGE FOR SAFETY GATE OF INJECTION MOLDING MACHINE

[76] Inventor: Karl Hehl, Arthur-Hehl-Strasse 32, 7298 Lossburg 1, Fed. Rep. of Germany

[21] Appl. No.: 295,008

[22] Filed: Aug. 21, 1981

[30] Foreign Application Priority Data

Aug. 21, 1980 [DE] Fed. Rep. of Germany ....... 3031499

[51] Int. Cl.³ .............................................. B29F 1/00
[52] U.S. Cl. ..................................... 425/153; 425/136
[58] Field of Search ................................. 425/151–154, 425/136

[56] References Cited

FOREIGN PATENT DOCUMENTS 61894 5/1968 German Democratic Rep. .
46-668 1/1971 Japan .................................. 425/152

Primary Examiner—Thomas P. Pavelko
Attorney, Agent, or Firm—Joseph A. Geiger

[57] ABSTRACT

A drive-reversing safety mechanism using a pivotable contact ledge on the leading edge of a mechanically openable and closable safety gate of an injection molding machine, the pivot axis being arranged at a flange corner of the safety gate, where the channel-shaped contact ledge engages the outside of the corner with a fillet of a ledge fold. An adjacent positioning flange of the contact ledge is yieldingly clamped to the safety gate by means of pins and compression springs. An actuator plate attached to the contact ledge cooperates with a switch controlling the safety gate drive.

10 Claims, 3 Drawing Figures

CONTACT LEDGE FOR SAFETY GATE OF INJECTION MOLDING MACHINE

BACKGROUND OF THE INVENTION

1. Field of the Invention

The present invention relates to injection molding machines and, more particularly, to a mechanically openable and closable safety cover for the die closing unit of an injection molding machine which has a drive-reversing safety mechanism with a contact member on its leading edge, for the protection of the machine operator.

2. Description of the Prior Art

Injection molding machines require a safety cover, or covers, which prevent access to the injection molding die, when the machine is in operation. The use of a mechanically closable cover brings with it the additional requirement of protecting the operator or mechanic against injury from the closing cover.

The East German Pat. No. 61 894 discloses a drive-reversing safety mechanism on the leading edge of a movable screen which is arranged in front of the die closing unit of an injection molding machine. The safety screen is openable and closable by means of a pneumatic cylinder assembly, the extremity of its piston rod being connected to the frame of the safety screen. Arranged a distance ahead of the leading edge of the safety screen is a vertical contact bar which is spring-biased forwardly, away from the leading edge. The contact bar is supported and guided by the horizontally movable plunger of a pneumatic valve. This valve, when actuated by an approach displacement of the contact bar towards the leading edge of the safety screen, redirects the air which is supplied to the pneumatic cylinder, thereby reversing the movement of the latter and reopening the safety gate.

The disclosed contact member is guided for straight-line motion by virtue of its attachment to the valve plunger. Such a straight-line guide, in order to be effective, requires guide points which are spaced far apart, as well as correspondingly sturdy components, in order to prevent canting from contact forces which are vertically offset from the guide axis and/or engage the contact bar from an angle relative to its guide axis.

Another shortcoming of this prior art device relates to the relatively elevated force which is required to displace the safety bar and its attached pneumatic valve plunger, in opposition to preloaded compression springs which have to be strong enough to move the safety bar and plunger in the opposite direction. This problem is aggravated by a relatively slow response of the pneumatic cylinder to the action of the pressure-reversing valve.

SUMMARY OF THE INVENTION

It is a primary objective of the present invention to suggest an improvement over the above-described prior art safety mechanism in the form of a device which is free of the stated shortcomings and which, while requiring only a few simple components, offers an inexpensive and reliable solution to the stated problem.

The present invention proposes to attain this objective by suggesting a drive-reversing safety mechanism which features a pivotable contact ledge on the leading edge of the safety gate which, because of its pivotability, is free of canting tendencies under off-center and/or angled contact forces, responding to an obstacle by actuating a drive-reversing electrical switch.

In a preferred embodiment of the invention, the pivotability of the contact ledge is provided by an open hinge connection between a supporting pivot corner on the safety gate and a matching fillet in the pivot fold of the contact ledge, whereby the contact ledge is held in place and returned to its rest position by means of two pins and two compression springs. The electrical switch has a switch plunger in parallel alignment with the pivot axis of the contact ledge, the plunger being depressed by an actuator plate which is attached to the pivotable contact ledge.

The sensitivity of response of this switching configuration is enhanced by an actuator cam on the actuator plate, which makes it possible to adjust the contact safety mechanism for a rapid drive-reversing response to even a slight pressure against the contact ledge.

BRIEF DESCRIPTION OF THE DRAWINGS

Further special features and advantages of the invention will become apparent from the description following below, when taken together with the accompanying drawings which illustrate, by way of example, a preferred embodiment of the invention which is represented in the various figures as follows.

DESCRIPTION OF THE PREFERRED EMBODIMENT

Figure 1:
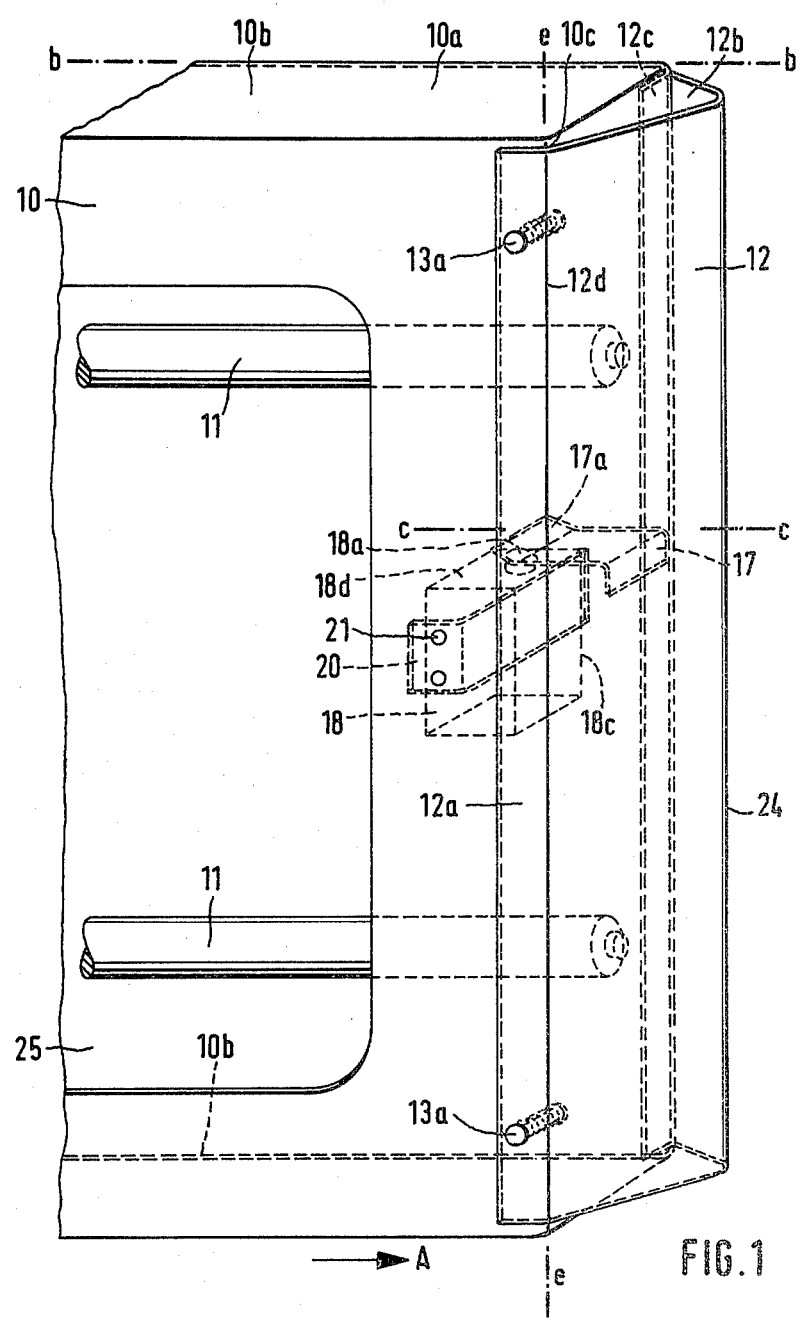
FIG. 1 shows, in a prospective representation, the leading portion of a safety gate carrying a drive-reversing contact ledge as an embodiment of the present invention.

The contact ledge of the invention is shown in the drawings as part of a generally rectangular safety gate 10 which, in this particular example, is the front gate of an assembly of three safety gates covering the front, top and rear of the die closing unit of an injection molding machine. The three gates are movable separately or in unison between a closed position and an open position in which the injection molding die is freely accessible from three sides. Such a safety cover assembly is disclosed in my copending U.S. patent application Ser. No. 290,225, filed Aug. 5, 1981. The disclosure of this earlier application is to be considered incorporated herein by reference.

In the various figures, the arrow A indicates the direction of closing movement of the safety gate 10. The latter is guided for its opening and closing movements by means of two guide rods 11 (FIG. 1) which are attached to the upstanding flanges 10a on the leading and trailing edges of the safety gate 10 and run in guide bushings of a stationary supporting frame of the cover assembly (not shown). Each safety gate has its own gate drive, preferably in the form of an electric gear motor driving a timing belt loop which entrains the safety gate.

Figure 2:
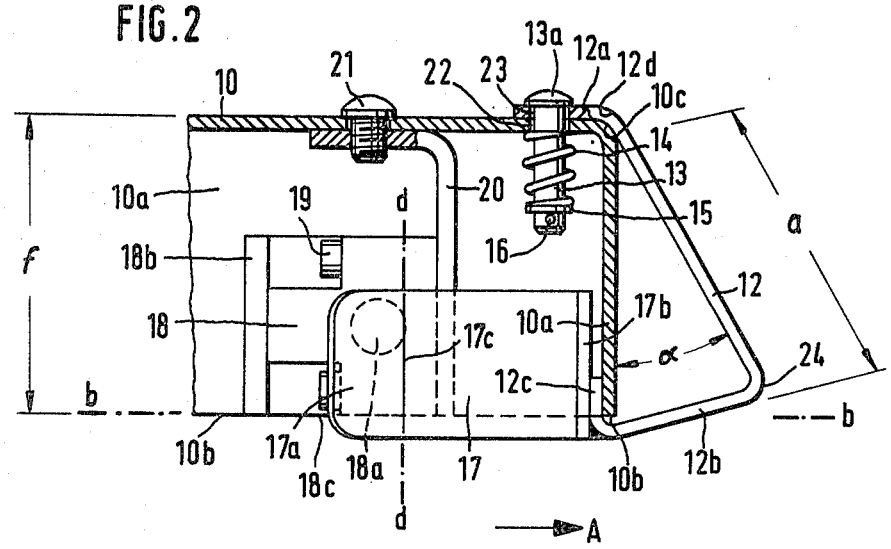
FIG. 2 shows, at an enlarged scale, a transverse cross section through the leading edge of the safety gate of FIG. 1 with the contact ledge in its rest position.

As can be seen in FIG. 1, the leading edge of the safety gate 10 carries a contact ledge 12 in the form of a sheet metal channel which extends over the entire height of the safety gate 10. The cross-sectional shape of the contact ledge 12 and the operational functions of this shape can best be seen in FIGS. 2 and 3.

The contact ledge 12 is held in place at the leading edge of the safety gate 10 by means of two spring pins 13 which provide a yielding clamping action between a positioning flange 12a of the contact ledge 12 and an edge portion of the safety gate 10 near a pivot corner 10c formed by an upstanding side flange 10a of the gate 10.

On the opposite side, the contact ledge has a short end flange 12c which reaches behind the edge 10b of the side flange 10a, thereby limiting the forward pivotability of the contact ledge. This rest position of the contact ledge 12 is maintained by two compression springs 14 which pull the heads 13a of the spring pins 13 against the positioning flange 12a. The springs 14 are held in place on the pins 13 by means of washers 15 and cotter pins 16.

Figure 3:
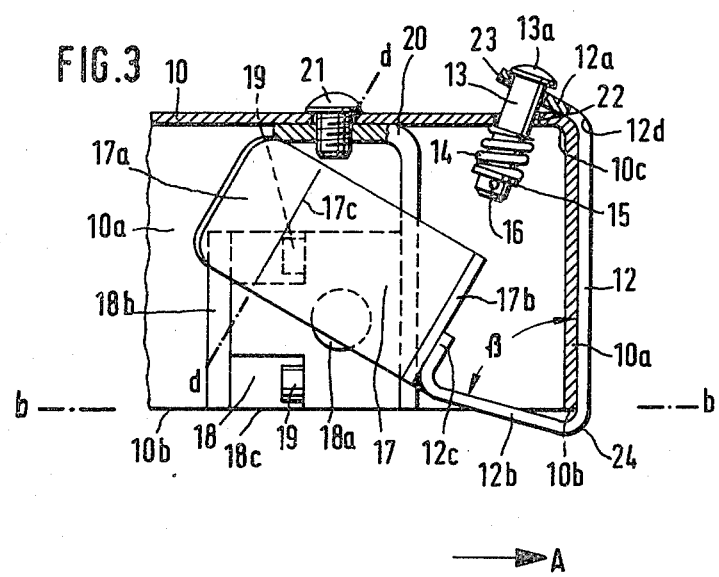
FIG. 3 shows the configuration of FIG. 2 with the contact ledge in its fully pivoted position.

When, during the closing movement of the safety gate 10 in the direction of arrow A, the contact ledge 12 encounters an obstacle, such as an arm or hand of an operator reaching into the die closing unit, for example, the contact ledge immediately yields by executing a pivoting motion towards the flange 10a of the safety gate. FIG. 3 shows the extreme pivoted position in which the contact ledge 12 abuts against the side flange 10a of the safety gate 10.

A pivoting displacement of the contact ledge 12 causes its positioning flange 12a to lift the two spring pins 13 into an oblique position, while compressing their springs 14. The bores 22 and 23 in the safety gate and in the positioning flange, respectively, have sufficient clearance to allow for the tilting movement of the spring pins 13. The compression springs 14 return the pivoted contact ledge 12 to its rest position (FIG. 2), as soon as the contact pressure against the ledge ceases.

The vertical pivot axis for the contact ledge 12 is formed by the rounded pivot corner 10c at the base of the flange 10a, in cooperation with a matching fillet of the contact ledge 12 in the ledge pivot fold 12d. The contact ledge 12 thus rotates about the center of the radius of the pivot corner 10c, represented by the axis e—e in FIG. 1. The fillet radius of the ledge pivot fold 12d is preferably the same or slightly larger than the pivot corner radius.

The opposite portion of the contact ledge 12 is formed by two folds of approximately 75° each (angle β in FIG. 3), forming an approximately isosceles triangle of which one corner forms a forwardly protruding contact edge 24 on the contact ledge 12. The distance a of the contact edge 24 from the pivot axis e—e is approximately identical to the depth f of the safety gate 10 at its side flange 10a, and the maximum movement angle of the contact ledge 12 about its pivot axis e—e is approximately 30° (angle α in FIG. 2).

As can be seen in FIG. 1, the safety gate 10 carries a switch 18 arranged at approximately mid-height of the gate 10, between its window 25 and its side flange 10a. The switch 18 is supported by an angle bracket 20 which is clamped to the inside of the safety gate 10 by means of two screws 21. The switch 18 is part of an electric circuit which controls the gate driven motor (not shown). It has a switch plunger 18a which is movable vertically, i.e. parallel to the pivot axis e—e of the contact ledge 12.

Cooperating with the switch plunger 18a is an actuator plate 17 which is attached to the end flange 12c of the contact ledge 12 and extends rearwardly over the switch 18, just above the top wall 18d of the switch housing. The actuator plate 17 moves horizontally, in a plane c—c (FIG. 1) which is perpendicular to the pivot axis e—e. Along the line d—d which is transverse to the actuator plate 17, the latter has a bend line 17c at which the free end portion of the plate 17 is bent upwardly a small amount to form an actuator cam 17a.

In the rest position of the contact ledge 12, the actuator plate 17 is so positioned that the actuator cam 17a reaches over the rounded extremity of the switch plunger 18a, being in contact or near-contact with the latter. The opposite extremity of the actuator plate 17 has an angled-off attachment flange which is permanently attached to the end flange 12c of the contact ledge 12 by a weld, for example. The inwardly facing housing wall 18c of the switch 18 is preferably flush with the plane b—b defined by the edge 10b of the gate flange 10a.

By vertically adjusting the position of the switch 18 on the screws 21 which clamp the angle bracket 20 to the safety gate 10, it is possible to adjust the switching action of the switch plunger 18a for an early response to a pivoting movement of the contact ledge 12. Alternatively, it is also possible to obtain such an adjustment on the screws 19 which clamp the switch 18 to the angle bracket 20 and/or by bending the actuator plate 17 or its cam portion 17a.

The switching action of the switch 18 may be such that, following its actuation by the actuator plate 17 of the contact ledge 12, the safety gate drive returns the safety gate to its fully open position. Alternatively, the drive circuit for the safety gate drive may be such that a return of the contact ledge 12 to its rest position and a corresponding release of the switch plunger 18a cause the safety gate drive to resume the gate closing movement. Lastly, it is also possible to arrange the gate drive circuit in such a way that the actuation of the switch 18 stops the forward movement of the safety gate 10 and that the gate drive remains deenergized until a command to close or open the safety gate is received from the machine controls.

It should be understood, of course, that the foregoing disclosure describes only a preferred embodiment of the invention and that it is intended to cover all changes and modifications of this example of the invention which fall within the scope of the appended claims.

I claim the following:

1. In a production machine such as, for example, an injection molding machine, as part of a safety gate which is movable between open and closed positions by means of a safety gate drive, a safety mechanism for the interruption of the closing movement of the safety gate, in response to the presence in the path of the safety gate of an object or obstacle, the safety mechanism comprising in combination:

a straight leading edge on the safety gate extending transversely to the direction of movement of the safety gate;

a contact ledge extending parallel to the leading edge of the safety gate and ahead of the latter, the contact ledge being attached to the safety gate by means of a pivot connection with a pivot axis which is likewise parallel to the leading edge of the safety gate;

means for biasing the pivotable contact ledge forwardly away from the leading edge of the safety gate into a rest position in which an obstacle in the path of the closing safety gate causes the contact ledge to pivot rearwardly towards said leading edge, in opposition to the contact ledge biasing means; and means for switching an electrical circuit of the safety gate drive in response to a rearward pivoting movement of the contact ledge.

2. A safety mechanism as defined in claim 1, wherein the safety gate has a thickness at its leading edge defined by the distance between its inner and outer sides;

the contact ledge is a channel-shaped member, the back side of the channel facing in the direction of closing advance of the safety gate, for contact with said ledge-pivoting obstacle;

the width of the contact ledge channel corresponds approximately to the thickness of the safety gate at its leading edge; and the pivot connection between the contact ledge and the safety gate involves a pivot corner on one side of the safety gate and a longitudinal edge portion of the contact ledge channel.

3. A safety mechanism as defined in claim 2, wherein the pivot connection between the contact ledge and the safety gate is an open hinge formed by the pivot corner of the safety gate and the fillet of a longitudinal fold in said edge portion of the contact ledge; and the pivot connection further includes means for yieldingly clamping the edge portion of the contact ledge against the safety gate in the area of its pivot corner so as to bias the fold fillet of the contact ledge against the pivot corner, while allowing a limited pivoting movement therebetween.

4. A safety mechanism as defined in claim 2, wherein the safety gate has its outer side in the area of its leading edge defined by a substantially flat panel;

the safety gate further includes a flange which adjoins the panel approximately perpendicularly, thereby forming a corner which serves as its pivot corner;

the contact ledge has a longitudinal fold forming an obtuse included angle between a central portion of its channel shape and a positioning flange representing said edge portion;

the contact ledge fold has a fillet with which it engages the pivot corner of the safety gate, as part of the pivot connection between the latter and the contact ledge; and the pivot connection further includes means for yieldingly clamping the positioning flange of the contact ledge against the safety gate panel adjacent to the pivot corner, with the result that, in the rest position of the contact ledge, the adjoining central portion of the channel shape forms an acute angle with the flange of the safety gate.

5. A safety mechanism as defined in claim 4, wherein the clamping means includes at least one headed pin reaching from the outside through bores of the positioning flange and safety gate panel to the inside of the latter and a compression spring surrounding and cooperating with the pin so as to urge the positioning flange against the safety gate panel; and the acute angle between the flange of the safety gate and the central portion of the contact ledge channel is less than 45°.

6. A safety mechanism as defined in any one of claims 1 through 5, wherein the switching means includes an electrical switch with a depressible switch plunger, the switch being mounted on the safety gate, at a distance behind its leading edge, and so oriented that the axis of the switch plunger is parallel to the axis of the pivot connection; and the contact ledge includes, as part of said switching means, an actuator plate which extends rearwardly from the contact ledge into operative engagement with the switch plunger.

7. A safety mechanism as defined in claim 6, wherein the actuator plate is oriented to be substantially perpendicular to the pivot axis of the contact ledge; and the actuator plate includes an actuator cam in the form of an inclined plate surface located near the switch plunger in the rest position of the contact ledge.

8. A safety mechanism as defined in claim 4 or claim 5, wherein the channel shape of the contact ledge includes an end flange on the opposite side of its positioning flange, the end flange being folded inwardly so as to point in the general direction of the pivot connection; and the end flange of the contact ledge reaches behind the edge of the safety gate flange, abutting against the latter in the rest position of the contact ledge.

9. A safety mechanism as defined in claim 8, wherein the switching means includes an electrical switch which is mounted on the safety gate, behind its leading edge, and a switch actuating member which is attached to the end flange of the contact ledge.

10. A safety mechanism as defined in claim 8, wherein the channel shape of the contact ledge has three major longitudinal folds, the first fold being said fold at the pivot connection between its positioning flange and its central channel portion, the second fold forming a protruding contact edge between the central channel portion and a bottom portion, and the third fold being a fold between the bottom portion and the end flange; and the central portion, the bottom portion, and the end flange of the channel shape define the outline of a substantially isosceles triangle with the pivot corner of the safety gate, so that the end flange is in parallel abutment with the inner side of the safety gate flange in the rest position of the contact ledge, and the central portion is in parallel abutment with the outer side of the safety gate flange in the fully pivoted position of the contact ledge.

* * * * *